Nov. 9, 1948.        C. KRISPIS        2,453,577
VARIABLE SPEED TRANSMISSION
Filed July 19, 1947
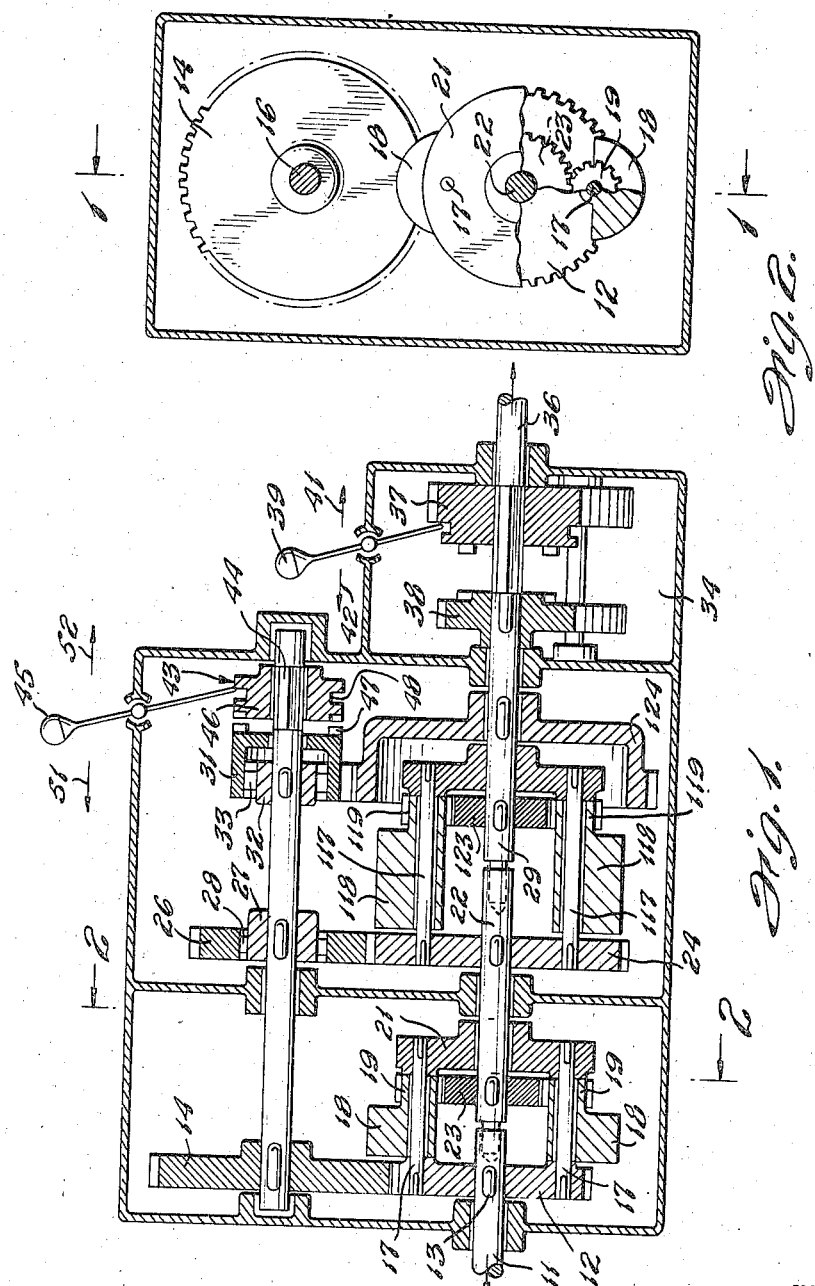
INVENTOR.
CONSTANTIN KRISPIS
BY Patented Nov. 9, 1948

2,453,577

UNITED STATES PATENT OFFICE 2,453,577

VARIABLE-SPEED TRANSMISSION

Constantin Krispis, Athens, Greece

Application July 19, 1947, Serial No. 762,172
In Greece March 28, 1947

2 Claims. (Cl. 74—260)

The invention relates to gearing and relates more particularly to automatic gear shifting. The invention is based on the use of movable eccentrical masses that are pivoted near the periphery of a gear. Said masses are adapted to carry out a planetary movement relative to the axis of rotation of the gear and to act as a clutch for automatically meshing the gear with, or releasing the gear from engagement with, another gear, respectively, depending on the ratio of the centrifugal force of the masses brought about by the rotation of the gear in relation to a revolving movement imparted to the masses by said second gear.

The invention may be described in connection with an automobile transmission box, but it will be understood that the invention is equally applicable to other gearing for automatic shifting.

It is one of the principal objects of the invention to provide mechanical automatic shifting means among several speeds within a gear transmission.

A further object of the invention is the provision of mechanical clutching means among several gears of a multiple speed transmission for automatically selecting the most propitious speed depending on the speed of rotation transmitted to the driving gear shaft and the load applied to the driven gear shaft.

A still further object of the invention is to provide eccentric masses revolving in a planetary motion about the driving shaft for coupling the same to a driven shaft, thereby detachably connecting the driven shaft to the driving shaft depending on the ratio of speeds intermediate the two shafts.

The invention accordingly comprises the features of construction, combination of elements and arrangement of parts which will be exemplified in a construction hereinafter set forth and the scope of the application of which will be indicated in the claims.

In the accompanying drawings,

Fig. 1 is a sectional view taken on line 1—1 of Fig. 2; and

Fig. 2 is an elevational view, partly in section, taken on line 2—2 of Fig. 1.

Referring particularly to Fig. 1, wherein a three speed gear box for an automobile is shown together with an additional mechanism for forward movement, reverse movement and for idling of the gear box, a driving shaft 11 is connected to a motor (not shown) to be rotated thereby, and is secured to a driving gear 12 by means of a key 13. Said gear 12 is in mesh with a gear 14 that is keyed to an auxiliary shaft 16; the auxiliary shaft 16 is spaced substantially parallel from the driving shaft 11, and, owing to the meshed gears 12 and 14, rotates together with said driving shaft 11.

The driving gear 12 carries, near its periphery, two oppositely disposed pins 17 that project from said driving gear 12 and are disposed substantially parallel to the driving shaft 11. A mass 18 is eccentrically pivoted on each pin 17, and a pinion 19 is coaxially connected to each mass 18 and integral therewith and located opposite the driving gear 12 relative to the mass 18. A disc 21 is located adjacent said pinions 19 and is connected to the pins 17 and is thus tied to the driving gear 12 and rotatable together therewith, to provide support for the pins 17.

A driven shaft 22 is aligned with the driving shaft 11 and telescoping thereinto, but freely rotatable and independent with relation thereto. The disc 21 is loosely fitted on said driven shaft 22. A driven gear 23 is keyed to the driven shaft 22 and is aligned and permanently in mesh with the pinions 19.

A gear 24 is keyed to the driven shaft 22 at a point spaced from the gear 23 and is in mesh with a gear 26 that surrounds the auxiliary shaft 16 and is secured thereon by means of a hub 27 and a unidirectional free wheeling connection 28 between said hub 27 and said gear 26. The gear 24 is larger than the gear 12, and conversely the gear 26 is smaller than the gear 14 of the auxiliary shaft 16. The gear 26 will be rotated from the free wheel mechanism 28 to drive the gear 24, but will idle when the gear 24 rotates the gear 26 faster than the same receives rotation from the hub 27.

When the driving shaft 11 is rotated by the motor, the driving gear 12 revolves together therewith and rotates the pins 17 about the shaft 11. Since the eccentric masses 18 are pivoted on the pin 17, they will rotate together with the gear 12 and will tend to be disposed radially with relation to the gear 12 due to the centrifugal force initiated by the rotation of the gear 12. When the driven shaft 22 is stationary due to the load, for instance of the automobile, connected thereto, the gear 23 will also be stationary. Since the gear 23 is in mesh with the pinion 19, the masses 18 will be driven in a planetary movement, that is about the shaft 11 as well as about its pin 17.

Increased angular speed of the gear 12 will tend to force the masses 18 outwardly with relation to the shaft 11 and to remain fixed in that position with respect to the gear 12. If the load applied to the driven shaft 22 is not very heavy, the masses 18 will approach that fixed position and will stop the movement about the pins 17 and thereby the pinions 19 will rotate the gear 23. This rotation will start slowly and pick up speed until the driven shaft 22 rotates with the same speed as the driven shaft 11.

However, if the load is too great for the driven shaft 22 to be thus energized, the shaft 22 will be driven by the gear 26 which is rotated by the auxiliary shaft 16 which, in turn, is energized by the gear 14 which is in mesh with the driving gear 12.

Conversely, when the shaft 22 is thus driven by the gear 24 and is accelerated, the eccentric masses 18 will couple the driven shaft 22 to the driving shaft 11 directly as soon as a predetermined speed ratio between the two shafts has been attained. Thereby, the transmission is automatically shifted between "direct speed" and "second speed", depending on the speed ratios of the driven shaft 22 to the driving shaft 11.

In order to provide a "first speed" or low gear, a similar mechanism with eccentric masses is arranged in connection with the gear 24. This gear 24 carries two pins 117 which are spaced diametrically opposite each other for the same distance as said pins 17. An eccentric mass 118 is pivoted to each pin 117, but these masses are heavier than the masses 18. A pinion 119 is integral with and axially arranged on each mass 118 and is in mesh with a gear 123 that is keyed to a freely turnable shaft 29 which is axially aligned with and telescopes into said driven shaft 22.

A large gear 124 is keyed to said shaft 29 at a point spaced from said gear 123 and is in mesh with a gear 31 that surrounds the auxiliary shaft 16. This large gear 124 has a larger diameter than the gear 24 and the gear 31 has accordingly a smaller diameter than the gear 26.

The gear 31 is connected with relation to the auxiliary shaft 16 in a similar manner as the gear 26, by means of a hub 32 and a free wheeling mechanism 33 between the gear 31 and the hub 32.

The operation of this "first speed" transmission is similar to the "second speed" transmission described in the foregoing. When the load on the shaft 29 is very heavy, the shaft 29 will be driven from the auxiliary shaft 16 by means of the gear 31 and the large gear 124. As soon as the shaft 29 has attained sufficient speed, the shaft 29 will be directly coupled to the driven shaft 22 by means of the eccentric masses 118 and the gear 123. Thereafter, the shaft 22 may be still further accelerated and be finally directly coupled to the driving shaft 11 so that the shafts 11, 22 and 29 are all directly interconnected and run at substantially the same speed. Thus, the transmission has been shifted automatically from "first speed" to "second speed" and then to "direct speed." If the load applied increases in relation to the motor speed, the steps will be reversed again, and "first" or "second" speed will be coupled, respectively, at a predetermined critical speed ratio of the shafts.

In order to provide forward and rearward movement as well as idling of the transmission, an additional mechanism 34 is arranged which is of well known conventional construction. Instead of extending the shaft 29 to the outside of the gear box for transmitting thereby the rotation to the propelling wheels of the automobile, an additional shaft 36 is aligned with said shaft 29 and projects to the exterior of the transmission box. Each of the adjacent ends of the shafts 29 and 36 carries a keyed clutch part, the clutch part 37 on the shaft 36 being axially movable thereon for interengagement with and disengagement from the other clutch part 38. The clutch part 37 is movable by means of a handle 39 that may be moved among three positions, a vertical "neutral" position, a "forward" position indicated by arrow 41, and a rearward or "reverse" position, as indicated by arrow 42. The reverse mechanism is of the conventional gearing type and it is believed unnecessary to describe it in great detail herein.

When an automobile is going downhill, it is often desirable to check the speed thereof by connecting the motor at low gear to the propelling wheels. Therefore, a check mechanism 43 is provided and the checking carried out by connecting the gear 31 detachably to the auxiliary shaft 16, thereby shunting the free wheel mechanism 33 of the gear 31 and connecting positively the driving shaft 11 with relation to the energy delivering shaft 29, thus bridging the entire automatic speed shifting mechanism.

A portion of the auxiliary shaft 16 near the gear 31 is splined at 44, and a claw carrier 46 is axially movable thereon, but engaged to the splines to rotate with the auxiliary shaft 16. The gear 31 is provided with claws 47 disposed opposite the claws of the carrier 46, and, by axially shifting the carrier 46, the claws thereof may be interengaged to the claws 47. The above mentioned carrier is grooved at 48, and the exterior of a handle 49 protrudes into said groove 48. The handle may be moved to a "travelling" position, indicated by arrow 51, and to a "downhill" position, indicated by arrow 52. Thereby, during downhill movement of the automobile, the propelling wheels of the automobile will be connected at low gear to the motor and the speed of the car be checked.

Instead of utilizing the eccentric masses 18 and 118 performing a planetary move, these masses may also be used in accordance with a system which operates without gears.

Since certain changes may be made in the above article and different embodiments of the invention could be made without departing from the scope thereof, it is intended that all matter contained in the above description or shown in the accompanying drawing shall be interpreted as illustrative and not in a limiting sense.

Having thus described the invention, what I claim as new and desire to be secured by Letters Patent, is as follows:

1. In a variable speed transmission comprising a driving shaft and an independently rotatable driven shaft, of a driving gear, an auxiliary shaft rotated by said driving shaft, two spaced gears keyed to said driven shaft, one of said keyed gears having a large diameter and the other one a comparatively smaller diameter, and means for transmitting energy from said driving gear to one of said keyed gears on said driving shaft selectively, depending on the ratio of energy imparted to said driving shaft and a load applied to said driven shaft, respectively, said means comprising a planetary gear pivoted to said driving gear spaced from said driving shaft and adapted to assume a stationary position relative to said driving gear upon attainment of a predetermined speed ratio intermediate said driven shaft and said driving shaft, and a gear meshing with said large keyed gear and unidirectionally driven by said auxiliary shaft for turning said driven shaft prior to attainment of said predetermined speed ratio between said driven and said driving shafts.

2. In a variable speed transmission, the combination with a driving shaft imparting rotating energy to said transmission and a driven shaft imparting rotating energy from said transmission, of a plurality of transmission elements intermediate said shafts for coupling the same at different selectable speed ratios, and means for automatically selecting a transmission element for coupling the shafts at a predetermined speed depending on the energy imparted to said driving shaft and a load applied to said driving shaft, said means comprising an auxiliary shaft spaced from said driving shaft and a plurality of meshed gear pairs, one gear of each pair surrounding the axis of said driving shaft and the other gear of each pair surrounding said auxiliary shaft, whereby rotating energy will be transmitted from the driving shaft to said driven shaft either by means of said auxiliary shaft or by directly coupling said driving with said driven shaft depending on the speed ratio therebetween, and eccentric masses adapted to move in a planetary movement about the axis of said driving shaft, for determining selection of alternate transmission by way of the auxiliary shaft or direct coupling, respectively, depending on the speed of rotation of said masses about said driving shaft.

CONSTANTIN KRISPIS.

REFERENCES CITED

The following references are of record in the file of this patent:

UNITED STATES PATENTS

| Number | Name | Date |
|---|---|---|
| 2,091,210 | Mattia | Aug. 24, 1937 |

FOREIGN PATENTS

| Number | Country | Date |
|---|---|---|
| 603,223 | France | Apr. 12, 1926 |
| 767,313 | France | July 16, 1934 |